United States Patent [19]

Camerik et al.

[11] 3,882,317

[45] May 6, 1975

[54] APPARATUS FOR READING A ROTATING DISC-SHAPED RECORD CARRIER

[75] Inventors: Eduard Camerik; Daniel Ong, both of Emmasingel, Eindhoven, Netherlands

[73] Assignee: U.S. Philips Corporation, New York, N.Y.

[22] Filed: July 23, 1974

[21] Appl. No.: 490,944

Related U.S. Application Data

[63] Continuation of Ser. No. 345,134, March 26, 1973, abandoned.

[30] Foreign Application Priority Data

Aug. 26, 1972 Netherlands ....................... 7211676

[52] U.S. Cl. ........................... 250/570; 179/100.3 V

[51] Int. Cl. ............................................ G01n 21/30

[58] Field of Search ........... 250/568, 570, 235, 236, 250/234; 235/61.11 E; 179/100.3 V, 100.3 E, 100.3 L, 100.3 R

[56] References Cited

UNITED STATES PATENTS

| | | | |
|---|---|---|---|
| 3,363,054 | 1/1968 | Mason | 179/100.3 V |
| 3,381,085 | 4/1968 | Johnson et al. | 179/100.3 V |
| 3,715,524 | 2/1973 | Adler | 250/570 |

*Primary Examiner*—James W. Lawrence
*Assistant Examiner*—D. C. Nelms
*Attorney, Agent, or Firm*—Frank R. Trifari; Simon L. Cohen

[57] ABSTRACT

Apparatus for reading a rotating disc-shaped record carrier containing video and/or audio signals coded in optical form. The apparatus includes a displaceable optical read unit which comprises a source of radiation and a first mirror on which a beam of radiation emitted by the source and following a U-shaped path impinges and which reflects it to the record carrier. A beam-splitting element and a second mirror are disposed at the bends of the U-shape, while behind the half-silvered mirror is arranged a detector unit which receives a radiation beam reflected at the record carrier. The U-shaped configuration lies in a plane which extends parallel to the plane of rotation of the record carrier, the opening of the U facing the interior of the apparatus.

6 Claims, 1 Drawing Figure

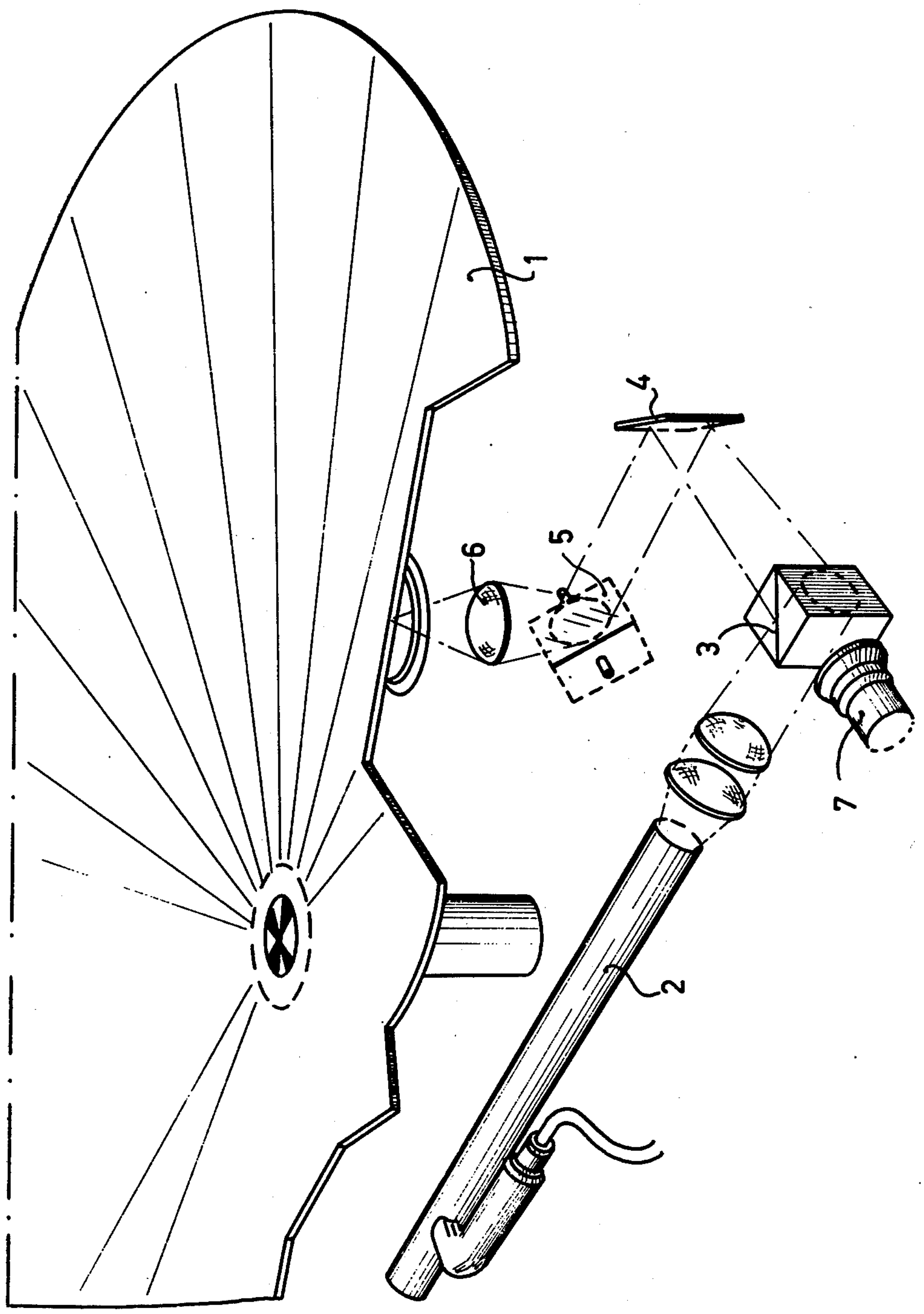

APPARATUS FOR READING A ROTATING DISC-SHAPED RECORD CARRIER

This is a continuation of application Ser. No. 345,134, filed Mar. 26, 1973, now abandoned.

The invention relates to an apparatus for reading a rotating disc-shaped record carrier which contains video and/or audio signals coded in optical form, which apparatus includes a displaceable optical read unit which is disposed beneath the plane of rotation of the record carrier and comprises a source of radiation, a first mirror which receives a beam of radiation emitted by the source and reflects it towards the record carrier, a beam splitting element which is inserted in the path of the radiation between the source and the first mirror and on which falls a beam of radiation reflected by the record carrier and the first mirror, and a detector unit which receives this reflected beam of radiation.

An apparatus of this type is described in our non-prepublished Netherlands Patent Application No. 7,204,205 filed Mar. 29, 1972 corresponding to U.S. Patent application Ser. No. 335,934, filed Feb. 26, 1973, and commonly assigned. In this apparatus the source of radiation, a half-silvered mirror and the first preferably pivotable mirror are arranged in a straight line parallel to the record carrier. Such an arrangement has the disadvantage that it is comparatively bulky in a radial direction.

It is an object of the present invention to provide an improved apparatus which has a more compact construction and the dimensions of which in the radial direction are reduced to a minimum.

For this purpose an apparatus of the type described at the beginning of the specification according to the invention is characterized in that the relative arrangement of, in succession, the source of radiation, the beam splitting element and the first mirror is such that with the addition of a second mirror a beam of radiation emitted by the source reaches the first mirror along a U-shaped path, the U-shape being situated in a plane which extends parallel to the plane of rotation of the record carrier, while the opening of the U faces the interior of the apparatus.

The steps according to the invention provide an arrangement in which the path of the radiation from the radiation source to the first mirror is U-shaped, resulting in optimal dimensions in the radial direction, which is particularly useful when the radiation source is a gas laser which, as is known, has a certain length.

A suitable embodiment of the invention consists in that the beam splitting element is disposed at the bend of the U nearer to the radiation source and the detector unit is arranged behind this mirror in line with the cross-piece of the U, ensuring better accessibility of the detector unit.

An embodiment of the invention will now be described, by way of example, with reference to the accompanying diagrammatic drawing, the single FIGURE of which is a schematic perspective view of an apparatus according to the invention.

Referring now to the FIGURE, the apparatus according to the invention shown serves for reading a rotating disc-shaped record carrier 1, which may be either a solid disc of a comparatively rigid material or a thin foil. This record carrier is provided with an information track which in general is spiral and in which both frequency-modulated and amplitude-modulated video and/or audio signals are stored in optical form. These signals are read by means of a beam of radiation which in accordance with the manner in which the information is recorded is modulated in amplitude or in phase by this information.

The beam of radiation is produced, and the information contained in it after reflection at the record carrier is detected, by means of a displaceable optical read unit which in the embodiment shown is disposed beneath the plane of rotation of the record carrier. This unit comprises a source of radiation 2, which preferably is in the form of a gas laser, a half-silvered mirror 3 on which the beam of radiation emitted by the source 2 impinges, a mirror 4 on which the beam reflected by the mirror 3 impinges, and a mirror 5 on which via the mirrors 3 and 4 the radiation beam emitted by the source impinges and which reflects this beam via a focussing lens system 6 to the record carrier 1. The mirror 5 is pivotable and during reading is pivoted by means not shown.

The radiation beam reflected at the record carrier impinges on the mirror 5, then on the mirror 4 and then on the half-silvered mirror 3 which transmits this reflected beam to a detector unit 7 disposed behind the mirror 3.

As the FIGURE shows, the relative arrangement of, in succession, the source of radiation 2, the half-silvered mirror 3 and the mirrors 4 and 5 is such that a radiation beam emitted by the radiation source reaches the mirror 5 along a U-shaped path The U-shaped configuration lies in a plane parallel to the plane of rotation of the record carrier, the opening of the U facing the interior of the apparatus. The detector unit 7 is aligned with the cross-piece of the U behind the half-silvered mirror 3.

It should be noted that the invention is not restricted to the aforedescribed embodiment shown in the drawing, in which the half-silvered mirror 3 is located at the bend of the U nearer the source of radiation.

If desired, the mirrors 3 and 4 may be interchanged, in which case the detector unit 7 located behind the half-silvered mirror 3 must be disposed near the other bend of the U.

In order to reduce the radiation-loss and to prevent radiation reflected from the record carrier to enter the laser cavity, the half-silvered mirror 3 may be replaced by a polarization splitting prism. This prism for example may transmit only radiation having a plane of polarization parallel to the plane of the record carrier while reflecting radiation having a plane of polarization at right angles to the plane of the record carrier. When using a polarization-splitting prism, a $\gamma/4$ plate (not shown), should be arranged in diagonal orientation, in the radiation path from the prism to the record-carrier. This ensures that the plane of polarization of the radiation reflected to the prism is rotated through 90° with respect to the radiation emerging from that prism, so that the former radiation is transmitted by the prism if the latter radiation is reflected by the prism.

What is claimed is:

1. Apparatus for reading a rotating disc-shaped record carrier which contains optically encoded signals on a reflective lower surface thereof, comprising a gas laser beneath the record carrier providing a radiation beam along a first path parallel to the surface of the record carrier, a beam splitting mirror in the path of the radiation from the radiation source oriented to reflect the radiation from the radiation source along a second path parallel to the record surface and normal to the direction of the beam from the radiation source, a second mirror in the path of the light from the beam splitting mirror and oriented to reflect the beam from the beam splitting mirror along a third path parallel to the first path, a third mirror positioned in the third path and oriented to reflect the radiation beam to the reflecting surface of the record carrier along a fourth beam path, a lens in the fourth beam path for focussing the beam on a small area of the reflecting surface of the record carrier and for directing the radiation reflected from the carrier back to the third mirror, the radiation reflected from the carrier thereafter being reflected along the third and second beam paths to the beam splitting mirror, and a radiation-sensitive detector aligned with the second beam path and positioned on a side of the beam splitting mirror remote from the second mirror.

2. Apparatus as claimed in claim 1, wherein the beam-splitting element is a half-silvered mirror.

3. Apparatus as claimed in claim 1, wherein the beam-splitting element is formed by a polarization-splitting prism and a $\gamma/4$-plate, arranged between this prism and the plane of rotation of the record carrier to be read.

4. Apparatus for reading a rotating disc-shaped record carrier containing optically encoded information signals on a reflective surface thereof, comprising a gas laser for providing a radiation beam along a first path beneath the record carrier and in the direction parallel to the surface thereof, a first mirror positioned in the first beam path for reflecting the radiation in a direction parallel to the surface of the record carrier and normal to the direction of the first beam path, a beam splitting mirror positioned in the second beam path for reflecting the radiation from the first mirror along a third beam path parallel to the first beam path, a third mirror positioned in the third beam path for reflecting the radiation along a fourth beam path to the reflective surface of the record carrier, a lens positioned in the fourth beam path for focussing the radiation on a small area of the reflecting surface of the record carrier and for directing the radiation reflected from the record carrier back along the fourth beam path to the third mirror, the third mirror thereafter reflecting the radiation to the beam splitting mirror along the third path, and a radiation-sensitive detector aligned with the third beam path on a side of the beam splitting mirror remote from the third mirror.

5. Apparatus as claimed in claim 4, wherein the beam-splitting element is a half-silvered mirror.

6. Apparatus as claimed in claim 4, wherein the beam-splitting element is formed by a polarizationsplitting prism and a $\gamma/4$ plate, arranged between this prism and the plane of rotation of the record carrier to be read.

* * * * *

UNITED STATES PATENT OFFICE
CERTIFICATE OF CORRECTION

Patent No. 3,882,317 Dated May 6, 1975

Inventor(s) EDUARD CAMERIK and DANIEL ONG

It is certified that error appears in the above-identified patent and that said Letters Patent are hereby corrected as shown below:

IN THE SPECIFICATION

Col. 2, line 29, after "path" should be -- . --(a period)

Col. 2, line 51, " $\gamma/4$" should be -- $\lambda/4$--;

IN THE CLAIMS

Claim 3, line 3, " $\gamma/4$" should be -- $\lambda/4$--;

Claim 6, line 3, " $\gamma/4$" should be -- $\lambda/4$--;

Signed and sealed this 15th day of July 1975.

(SEAL)
Attest:

RUTH C. MASON
Attesting Officer

C. MARSHALL DANN
Commissioner of Patents
and Trademarks